(12) United States Patent
Sochor et al.

(10) Patent No.: US 10,969,320 B2
(45) Date of Patent: Apr. 6, 2021

(54) METHOD AND DEVICE FOR ONLINE DETERMINATION OF THE VISCOSITY OF A POLYMER

(71) Applicant: EREMA ENGINEERING RECYCLING MASCHINEN UND ANLAGEN GESELLSCHAFT M.B.H., Ansfelden (AT)

(72) Inventors: Sebastian Sochor, Niederneukirchen (AT); Florian Schieder, Kematen a. d. Krems (AT)

(73) Assignee: EREMA ENGINEERING RECYCLING MASCHINEN UND ANLAGEN GESELLSCHAFT M.B.H., Ansfelden (AT)

( * ) Notice: Subject to any disclaimer, the term of this patent is extended or adjusted under 35 U.S.C. 154(b) by 96 days.

(21) Appl. No.: 16/318,352

(22) PCT Filed: Jul. 18, 2017

(86) PCT No.: PCT/AT2017/060178
§ 371 (c)(1),
(2) Date: Jan. 16, 2019

(87) PCT Pub. No.: WO2018/014060
PCT Pub. Date: Jan. 25, 2018

(65) Prior Publication Data
US 2019/0250086 A1    Aug. 15, 2019

(30) Foreign Application Priority Data

Jul. 18, 2016   (AT) .............................. A 50638/2016

(51) Int. Cl.
*G01N 11/06*    (2006.01)
*G01N 1/20*    (2006.01)
(Continued)

(52) U.S. Cl.
CPC .............. *G01N 11/06* (2013.01); *B29C 48/92* (2019.02); *G01N 1/2035* (2013.01);
(Continued)

(58) Field of Classification Search
CPC ........ G01N 11/00; G01N 11/08; G01N 11/04; G01N 11/02
See application file for complete search history.

(56) References Cited

U.S. PATENT DOCUMENTS 2,066,016 A * 12/1936 Rossi ..................... G01N 11/00
73/54.13
3,203,225 A *  8/1965 Sicglaff .................. G01N 11/04
374/51
(Continued)

FOREIGN PATENT DOCUMENTS

DE    102016219832 A1    4/2018
GB        1111499 A        4/1968
(Continued)

OTHER PUBLICATIONS

International Search Report dated Oct. 18, 2017 from International Application No. PCT/AT2017/060178, filed on Jul. 18, 2017, 2 pages.
(Continued)

*Primary Examiner* — David A. Rogers
(74) *Attorney, Agent, or Firm* — Kilpatrick Townsend & Stockton LLP

(57) ABSTRACT

A method and a device for the online determination of the viscosity of a polymer in pasty to liquid form undergoing processing, such as extrusion is disclosed. It is provided that for the online determination of the viscosity of the polymer, at least a portion of the polymer undergoing processing is diverted and conveyed to the measurement volume of a measuring module, a predetermined volume of the respec-
(Continued)

tive batch is expelled from the measurement volume through a measurement nozzle by subjecting the batch to a predetermined pressure, the time required for expelling the predetermined volume of the batch is measured, the measured values are used for calculating the viscosity of the polymer, and prior to the filling of the measurement volume with the polymer to be measured, the measurement volume is flushed at least once with a quantity of the polymer being processed.

16 Claims, 2 Drawing Sheets

(51) Int. Cl.
  *B29C 48/92* (2019.01)
  *G01N 1/10* (2006.01)
(52) U.S. Cl.
  CPC ...... *G01N 1/2042* (2013.01); *B29C 2948/922* (2019.02); *B29C 2948/9259* (2019.02); *B29C 2948/92409* (2019.02); *B29C 2948/92523* (2019.02); *G01N 2001/105* (2013.01)

(56) References Cited

U.S. PATENT DOCUMENTS

| | | | | |
|---|---|---|---|---|
| 3,252,320 A * | 5/1966 | Welty | ............... | G01N 11/08 73/54.14 |
| 3,279,240 A * | 10/1966 | Kowalski | ............... | G01N 11/04 374/51 |
| 3,360,986 A | 1/1968 | Rothschild | | |
| 3,526,126 A | 9/1970 | Wilchinsky et al. | | |
| 3,758,776 A * | 9/1973 | Frohne | ............... | G01N 11/06 250/231.14 |
| 4,096,739 A * | 6/1978 | Barker | ............... | G01N 11/04 73/54.14 |
| 4,213,747 A * | 7/1980 | Friedrich | ............... | B29C 48/92 425/144 |
| 4,229,970 A * | 10/1980 | Barker | ............... | G01N 11/02 264/409 |
| 4,425,790 A * | 1/1984 | Bice | ............... | G01N 11/08 73/54.05 |
| 4,573,345 A * | 3/1986 | Krutchen | ............... | G01N 11/08 73/54.14 |
| 4,680,958 A * | 7/1987 | Ruelle | ............... | B29C 48/92 73/54.14 |
| 4,817,416 A * | 4/1989 | Blanch | ............... | G01N 11/08 73/54.04 |
| 5,347,851 A * | 9/1994 | Grudzien, Jr. | ............... | G01L 9/0077 374/56 |
| 5,417,106 A * | 5/1995 | Grudzien, Jr. | ............... | G01L 9/0077 73/54.14 |
| 5,959,195 A * | 9/1999 | Gottfert | ............... | G01N 11/08 137/92 |
| 5,974,866 A * | 11/1999 | Tjahjadi | ............... | G01N 11/08 73/54.11 |
| 5,996,404 A * | 12/1999 | McCue | ............... | G01N 11/04 73/54.01 |
| 6,023,962 A * | 2/2000 | Wang | ............... | G01N 11/08 73/54.09 |
| 6,386,016 B1 * | 5/2002 | Gleissle | ............... | G01N 11/08 73/54.01 |
| 7,143,637 B1 * | 12/2006 | McBrearty | ............... | G01N 27/221 73/53.01 |
| 8,549,930 B2 * | 10/2013 | Wurzbach | ............... | G01N 11/08 73/861.52 |
| 9,739,694 B2 * | 8/2017 | Amanullah | ............... | G01N 3/08 |
| 2004/0020272 A1 * | 2/2004 | Lin | ............... | G01N 11/08 73/54.01 |
| 2012/0055266 A1 * | 3/2012 | Wurzbach | ............... | G01N 11/08 73/861.52 |
| 2012/0096929 A1 * | 4/2012 | Baek | ............... | G01N 11/08 73/54.14 |

FOREIGN PATENT DOCUMENTS

| | | |
|---|---|---|
| JP | 56157839 A1 * | 12/1981 |
| JP | A-H04-328446 A | 11/1992 |
| JP | A-H05-281128 A | 10/1993 |
| JP | A-2004-028772 A | 1/2004 |

OTHER PUBLICATIONS

Office Action dated Nov. 24, 2020, from Japanese Patent Application No. 2015-502251, 4 pages.

* cited by examiner

METHOD AND DEVICE FOR ONLINE DETERMINATION OF THE VISCOSITY OF A POLYMER

This application is a U.S. National Phase of International Application No. PCT/AT2017/060178, filed Jul. 18, 2017, which claims priority to Austrian Patent Application No. A50638/2016, filed Jul. 18, 2016, the disclosures of which are incorporated by reference herein.

The invention relates to a method according to the preamble of claim 1 and a device for implementation of the method according to the preamble of claim 8.

In addition, the invention relates to a method for processing, especially for recycling-processing, of a polymer, wherein the polymer is melted and the method for online determination of the viscosity of the polymer according to any one of claims 1 through 5 is used, as well as a device for processing, especially for recycling-processing, of a polymer, with a melting module for the polymer, preferably an extruder, and a device connected thereto for the online determination of the viscosity according to any one of claims 8 through 12.

In the processing of polymers, especially of thermoplastic polymers, knowledge about the properties thereof, especially the viscous properties, is of great significance. If polymers are to be evaluated regarding their viscous properties, there are evaluation methods targeted for various polymers, which are performed offline to a great extent, thus usually in the laboratory. However, it is of increasing importance to determine these properties directly in or during the manufacturing process. Usually, and especially in the case of polymers to be recycled, these polymers are pre-treated, generally comminuted, in a shredding container with tools and then worked up. Melting does not yet take place here, but heating or softening takes place during the residence time in this container. The pre-treated material is conveyed from this container to an extruder for melting.

Thus, as a rule, the processing of polymers involves an extrusion process. In these cases the polymer is usually completely melted, and the viscosity can be determined using various known methods.

Many of the known online measurement systems are limited by impurities. These systems often operate with small melting pumps that have clearances in the range of 20 µm. In polyolefin recycling, depending on the final application, contamination levels from 100 µm to 1000 µm in the melt are usual. The known systems do not have good long-term durability in such an environment.

The goal of the present invention is the creation of a device of simple design and good, reliable long-term durability and a method for online viscosity determination that delivers exact measured values. In particular, long-term measurements without interrupting the processing of the polymer should be possible.

For this purpose, the features of claim 1 are provided, namely that for the online determination of the viscosity of the polymer, at least one batch, preferably a number of batches following one another at time intervals, is diverted from the polymer being processed and conveyed to the measurement volume of a measuring module, that a specified volume of the respective batch is expelled from the measurement volume by subjecting the batch to a predetermined pressure through a measuring nozzle formed in the measuring module, optionally via a piston to which a predetermined force, preferably a constant force, is applied, that the time required for expelling the specified volume of the batch through the measuring nozzle is measured, that these measured values determined are used for calculating the viscosity of the polymer, and that before the measurement volume is filled with the polymer to be measured, the measurement volume and optionally also the feed line for the polymer to the measurement volume is flushed at least once with a quantity of the polymer to be processed.

A device according to the invention is characterised in that an extruder, an extraction module preferably formed by a line, is preferably connected to the melting module to extract batches of polymer present in pasty to liquid form, the extraction module is connected via a blocking module to a measurement module, preferably comprising an elongated measurement volume, having a measuring nozzle through which all or a predetermined portion of the batch conveyed to the measurement volume can be expelled from the measurement volume by pressurising with a pressure generator, a time measuring module is provided for measuring the duration of the expulsion of the predetermined quantity of polymer through the measuring nozzle, an evaluation module is provided for calculating the viscosity from the time measurement values obtained, and a control module is provided for actuating the blocking module and the pressure generator, with which the blocking module can be displaced at predetermined times into the opening or closing position, with which the flow of polymer to the measurement volume can be controlled, and this polymer can be used for flushing or measurement purposes.

The flushing performed between measurements allows for continuous processing of the polymer and serial determination of the viscosity. The measured values are not influenced by deposits in the device, residues from previous measurements, or contaminants, especially in the measurement volume.

After the polymer used for cleaning has been completely removed from the measurement volume or the piston cylinder, the specified volume of the batch to be measured can be introduced into the measurement volume. The force acting on the piston is not influenced or altered by deposits or clumping during the movement of the piston.

The flushing process can be performed quickly and efficiently when the polymer introduced into the measurement volume for flushing is diverted from the measurement volume through the measurement nozzle and/or into at least one discharge channel, preferably located in the upper region of the measurement volume or in the end region of the measurement volume located opposite the measurement nozzle. The flushing procedure is easy to integrate into the measurement method if the polymer used for flushing is conveyed to the measurement volume by pressure which it has at its diversion site during the processing thereof. For the measurement it is provided that when the flushing process has ended, the conveying of the polymer to the measurement volume is stopped, and either additional polymer is diverted and conveyed to the measurement volume and expelled through the measurement nozzle, or as the batch to be measured, the polymer from the flushing process still located in the measurement volume is expelled through the measurement nozzle as the diverted batch, and the time for expulsion is measured.

Depending on the temperature and the degree of softening of the polymer, it is anticipated that the measurement volume and optionally the discharge channel will be flushed with a quantity of polymer that is larger than the measurement volume and the feed channel leading from the diversion site to the measurement volume, and optionally is at least twice as large as these two volumes together.

The invention also relates to a method for processing, especially for recycling-processing, of a polymer, in which the polymer is melted and the method for the online determination of the viscosity of the polymer according to any one of claims 1 through 5 is used. Here it is advantageous if the measured values found are used for controlling the processing procedure, especially the melting process of the polymer, and/or for controlling the extruder, especially its rotation rate, wherein optionally manipulation of a downstream melt valve or a downstream granulate separator is performed and the polymer produced is segregated or sorted according to its viscosity. A device advantageously suited for this purpose is characterised in that a granulate separator or a melt valve is located downstream from the device or the melting module to which can be conveyed the polymer for which the viscosity is to be measured.

A structurally simple design that permits rapid and accurate measurements, wherein simultaneously the measurement volume can be flushed rapidly and cleanly and especially can easily be freed from remaining contamination, is obtained when the mouth of the line of the extraction module and the mouth of the discharge channel are located at opposite end regions of the measurement volume and/or the measurement nozzle and the orifice of the discharge channel are disposed in vertically opposite end regions of the measurement volume.

A defined control of the flushing process and measurement process is achieved by accurate circuitry of the blocking module and/or by the fact that the orifice of the discharge channel can be closed off by the piston of the pressure generator at the beginning of the movement of the piston into the measurement volume. The piston closes the discharge channel, and after closure of the discharge channel, the measurement process or the expulsion through the measurement nozzle can begin.

A device according to the invention is shown schematically in the drawing.

Figure 1:
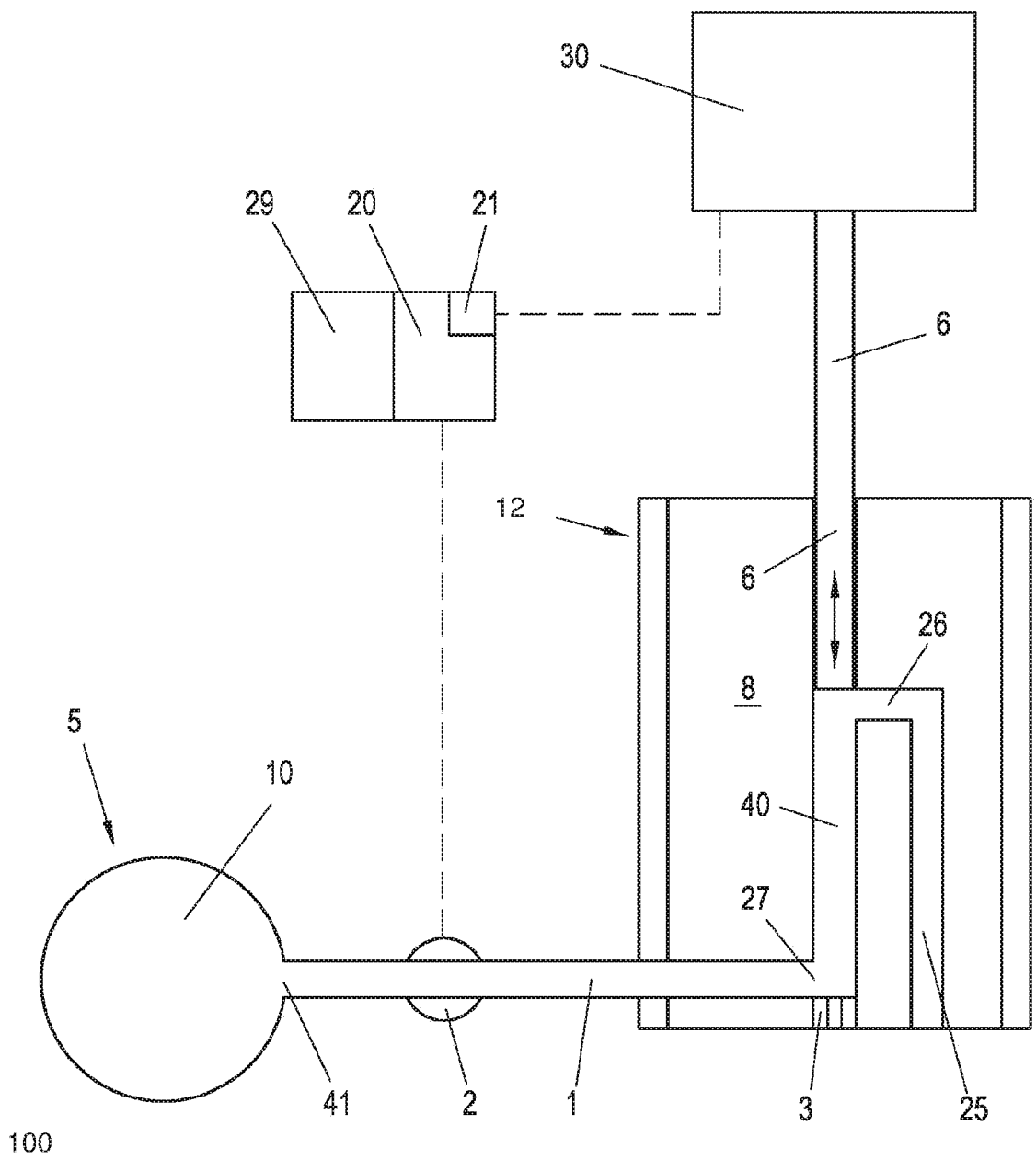
FIG. 1 shows the device according to the invention with a piston in the upper end position.

As is apparent from the drawing, to a processing module 100 of the polymer, preferably an extruder, a line 1 is connected for extracting the polymer 10 present in at least pasty to liquid form in predetermined quantities or for batchwise extraction.

At the end of the line 1 serving as an extraction module in which a blocking module 2, e.g., a control valve, is arranged, a measurement volume 40 is connected, which has a measuring nozzle 3, through which measuring nozzle 3 a predetermined quantity of the batch filling the measurement volume 40 can be expelled by applying a pressure using a pressure plate or piston 6. In addition, a measuring module 21 for measuring the time for expulsion of the batch through the measuring nozzle 3 and an evaluation module 29 for calculating the viscosity from the measured time values obtained are provided. Alternatively, the distance travelled by the piston 6 in a predetermined unit of time can be measured to determine the quantity of polymer 10 expelled through the measuring nozzle 3.

Thus, at a selectable point of the extrusion system or the melting module 5, at which point the polymer or the corresponding polymer mixture to be processed is present in transportable form, the measuring device 12 for viscosity determination, is connected directly to the extrusion system or the melting module 5 or the extraction module and the flowable polymer 10 is conducted into the measuring device 12 to be measured.

The measuring device 12 essentially comprises the time measuring module 21, the extraction module with line 1 and the blocking module 2, e.g., a blocking valve. The extraction module may be of various designs; the essential point is that the polymer can be conveyed to the measurement module as easily and quickly as possible. The blocking valve 2 is located between the extrusion system and the measurement volume 40 in the line 1. The sizing and design of the device according to the invention are selected such that the effect exerted on the batch of the polymer 10 extracted by residence time, temperature, etc., is as small as possible to obtain a representative measurement corresponding to the main stream in the extruder 5 of the melting module. The extraction module 1 is advantageously designed such that same extends into the inner region of a melt channel set off from an extruder in such a way as to allow extraction of a representative amount of polymer there.

The measurement module 12 comprises a measurement nozzle 3 (MFR nozzle) that can be replaced if necessary, which optionally may be selected from a number of measurement nozzles with different cross-sections. In addition, a piston 6 with selectable or variable weight or with an adjustable pressure generator 30 is movably arranged in an optionally temperature-controllable cylinder 8 that defines the measurement volume 40. The weight or the pressure generator 30 applies pressure via the piston 6 fitted into the cylinder 8 which forces the polymer 10 through the measurement nozzle 3. With the time measurement module 21, the time period required for expelling the polymer located in the measurement volume 40 or a predetermined fraction thereof is measured.

In addition to the measurement of the viscosity, measurements of the temperature and pressure of the melt can also take place. The temperature of the cylinder 8 and the measurement volume 40 can be regulated, i.e., they can be heated or cooled. For temperature regulation, the temperature of the cylinder 8 can be measured and, for example, this temperature can be adjusted with an electrical heating or cooling arrangement.

Using a control system 29 or a computer system that controls the blocking module 2 or the application of pressure to the piston 6, the measurement process can be automated or partially automated. For measuring the duration of expulsion of the batch, especially to perform an automation, the movement of the piston 6, especially the longitudinal movement of the piston 6, can be accurately recorded. Thus, the volume of polymer expelled can be predetermined or determined accurately. It has proven constructive to continuously record the distance travelled by the measuring piston 6 and thus determine the volume expelled. This allow adaptations of the measurement method to different measuring times, polymers etc. For this purpose an upper starting point and a lower ending point of the piston 6 can be determined or recorded. This can be done, for example, by passing a certain point on the piston through a photoelectric beam. By determining the distance travelled by the piston, the expelled volume of the batch can be determined, or the expulsion of a certain quantity of polymer can be specified using the piston distance. Thus, with the piston distance established, the duration of expulsion can be measured, or the duration of expulsion at a fixed pressure can be measured to obtain the measured values needed.

The measurement process can take place as follows in practice:

The melt from the processing system, the pressure of which is determined by the tool following the extruder or filled by the polymer under said pressure with the blocking module 2 open, presses the measuring piston 6 via line 1 into its upper position (FIG. 1) and fills the cylinder 8 or the measurement volume 40. When the piston 6 is in the upper position, the supply of melt is interrupted, and the measurement process of the batch is started by lowering the piston 6. The piston 6 can be held in its upper position by a device, especially by a mechanical or hydraulic or geometric device, until the inlet or the line 1 is completely closed. If backpressure is no longer present or the pressure in the measurement volume 40 is spent, the piston 6 is released. Then, the measuring piston 6 moves downward (FIG. 2) under its own weight or through the action of a pressure generator 30 and expels the polymer through the measurement nozzle 3. The geometry of the measurement nozzle 3, the temperature of the polymer in the measurement volume 40, and the piston pressure are selected according to the standard or by specification. A record is made of the time until the piston 6 has reached a predetermined point or its lowermost point. A travel distance measurement can be performed for this purpose. From the known geometries and the measured time, the MFR (melt flow rate) in g/10 min or MVR (melt volume rate) in cm3/10 min can be calculated according to DIN EN ISO 1133-2. It is also possible to calibrate the measuring module with substances of known viscosity. Then, the measured time can be set directly proportional to the viscosity.

By accurately determining the environmental parameters, specifically the melting point, it is possible to perform a correction of the values obtained and thus obtain the values predetermined by the standard. Basically, the melting point of the polymer, as a result of the small quantity thereof in the measurement volume 40, approaches the temperature of the measuring cylinder 8, which temperature of the measuring cylinder 8 is adjusted corresponding to the standard.

Instead of the weight of the piston 6, a pressure generator 30 may be used, which applies a predetermined, constant pressure to the piston 6, optionally adapted to the consistency of the polymer.

A vibrational decoupling between an extruder and the measurement apparatus or the device according to the invention has proven beneficial to prevent a change in the velocity of movement of the piston 6 due to vibrations of the extruder. It is also advantageous if the measurement apparatus or the measurement volume can be adjusted in the vertical direction independently of the extruder or the line 1 in order to minimise effects of the movement of the piston 6 due to the adjustment.

It has furthermore proven to have a positive effect if thermal decoupling from the environment is provided. This can be accomplished relatively easily using coverings and suitable insulation. Since the temperature control is an important characteristic for the precision of the measurement, for example, hot or cold air flows mustn't influence the temperature of the measurement apparatus. If the temperature control of the cylinder 8 is only performed using a heater, natural convection must be arranged in order to cool the cylinder 8 as well.

It has proven advantageous to provide a discharge or overflow channel 25, with which the measurement volume 40 and/or the cylinder 8 can be flushed rapidly when the piston 6 is in its upper position. This cleaning of the measurement volume 40 makes it possible to conduct continuous operation for days, weeks, or months without cleaning the measurement apparatus. By using an automated measurement process, a recording of the measured data can be prepared and a long-term trend determined.

The discharge channel 25 has an orifice 26 in the upper region of the measurement volume 40 and its cross-section makes a rapid flushing process possible. To flush the measurement volume 40 as completely as possible, the orifice 26 is formed at one end of the preferably elongated, particularly cylindrical, measurement volume 40, preferably the piston-side end, and the orifice 27 of the line 1 is formed at the other, opposite end. Upon entry or inward movement into the measurement volume 20, the piston 6 can obstruct the orifice 26 to prevent unwanted emergence of polymer, and the measurement process can start.

Since the measurement apparatus is based on the standard, one further gains the opportunity of also calculating viscosities for the polymers that are usually not given in MFR or MVR, and for which corresponding conversion formulas or models exist. Therefore, for example, the viscosity of polyester can also be measured.

The simplicity and robustness of the measurement principle and the measurement device should also be especially emphasised. For this reason, this measurement device may also be used for contaminated plastics containing larger-particulate contaminants.

The measurement of the viscosity takes place on polymers with a temperature above the Vicat softening temperature, optionally within the melting range of the polymer, but preferably in the temperature range in which the polymer exists in completely molten form.

In principle, the discharge channel 25 is not necessary. If the orifice 27 or the line 1 is located in the upper end region of the measurement volume 40, the measurement volume 40 can be flushed with polymer emerging through the measurement nozzle 3 when the piston 6 is in its upper end position.

Figure 2:
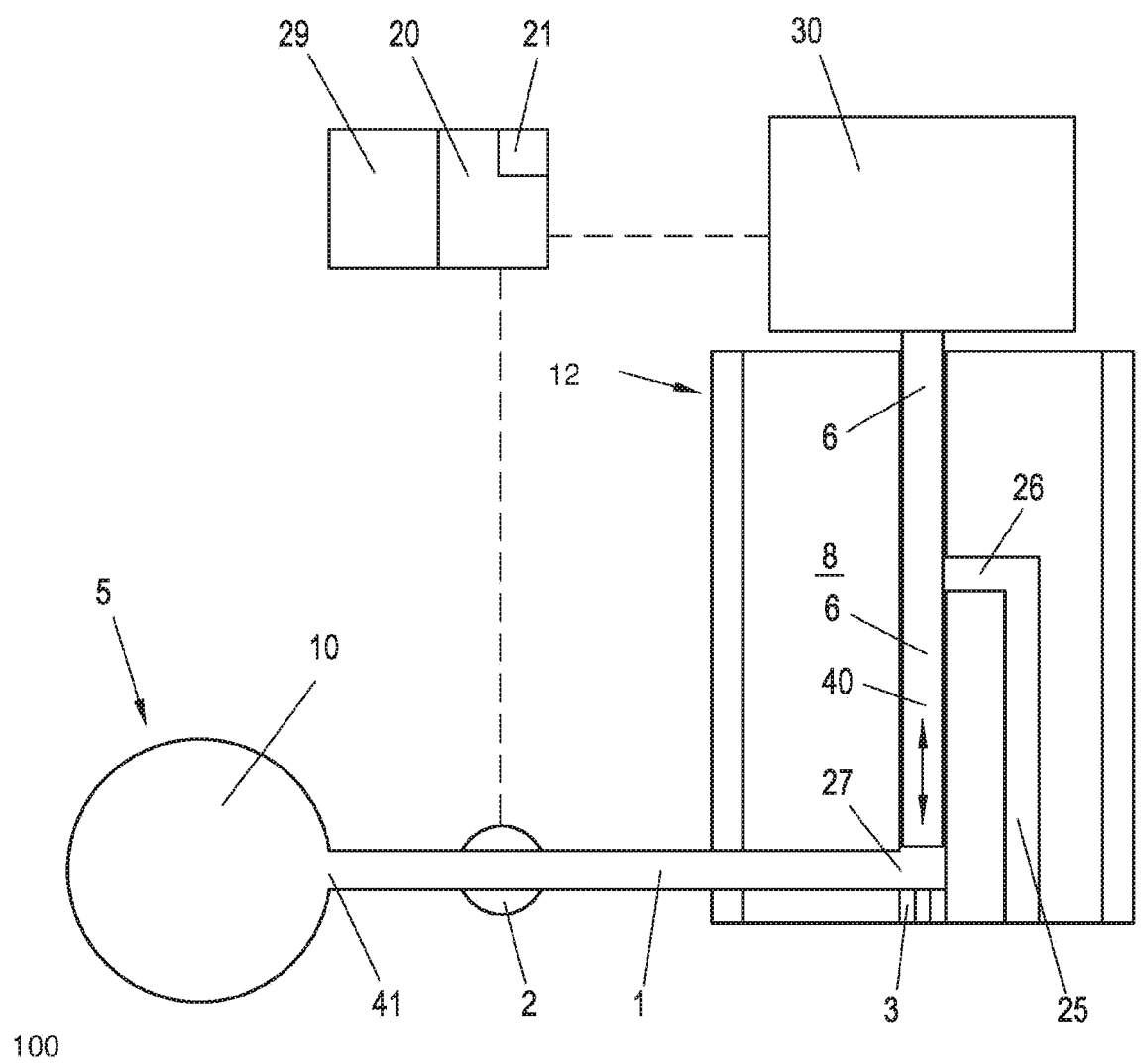
FIG. 2 shows the device with the piston retracted into the measurement volume.

It is apparent from FIGS. 1 and 2 that an evaluation module 29 is provided for calculating the viscosity from the measured time values obtained, and that a control module 20 is provided for actuating the blocking module 2 and the pressure generator 30 is provided, with which the blocking module 2 can be moved into opening or closing position at predetermined times, whereby the flow of polymer 10 into the measurement volume 40 can be controlled, and this polymer can be used for flushing or measurement purposes. The line 1 is connected to the processing module 100 and the melting module 5 at 41.

The invention claimed is:

1. A method for online determination of a viscosity of a polymer during processing, the method characterized in that,
for the online determination of the viscosity of the polymer at least one batch, a number of batches following one another at time intervals, is diverted from the polymer being processed and fed to a measurement volume of a measuring module,
a specified volume of the respective batch is expelled from the measurement volume by subjecting the at least one batch to a predetermined pressure through a measuring nozzle formed in the measuring module, a time required for expelling the specified volume of the at least one batch through the measuring nozzle is measured, and before the measurement volume is filled with the polymer to be measured, the measurement volume is flushed at least once with a quantity of the polymer to be processed, characterized in that:

the measured time is used for calculating the viscosity of the polymer, wherein the calculated viscosity is proportional to the measured time, and the polymer used for flushing is diverted from the measurement volume via a discharge channel, wherein an orifice of an extraction module and an orifice of the discharge channel are arranged at opposite end areas of the measurement volume.

2. The method according to claim 1, characterized in that the discharge channel is located in an upper region of the measurement volume or is located in an end region of the measurement volume opposite the measurement nozzle.

3. The method according to claim 1, characterized in that the polymer used for flushing is conveyed to the measurement volume by the pressure that it has during its processing at its diversion site.

4. The method according to claim 1, characterized in that, upon ending the flushing process, the feeding of the polymer to the measurement volume is stopped and either additional polymer is diverted and conveyed to the measurement volume and expelled through the measurement nozzle or as the at least one batch to be measured, the polymer from the flushing process still located in the measurement volume is expelled through the measurement nozzle as the diverted batch, and the time for expulsion is measured.

5. The method according to claim 1, characterized in that the measurement volume is flushed with a volume of polymer that is greater than the volume of the measurement volume and of a feed channel leading from a diversion site to the measurement volume.

6. The method according to claim 1, characterized in that the feeding of the polymer to the measurement volume takes place in a lower end region of the measurement volume and a removal of the polymer used for flushing takes place in the upper end region of the measurement volume.

7. The method according to claim 1, wherein the polymer is melted.

8. The method according to claim 7, characterized in that measured values determined for controlling the one or more of the polymer melting process, an extruder, a rotation speed of the extruder, are used, wherein an effect is produced on a downstream melting valve or a downstream granulate separator, and the polymer produced is segregated or sorted according to its viscosity.

9. A measuring device for the online determination of the viscosity of a polymer undergoing processing, used for carrying out the method according to claim 1, wherein an extraction module connectable by a line to a melting module is provided for extracting batches of the polymer present in pasty to liquid form, wherein the extraction module is connected via a blocking module to a measurement module comprising a measurement volume having a measuring nozzle through which all or a predetermined fraction of the batch conveyed to the measurement volume can be expelled by applying pressure with a pressure generator, wherein a time measuring module is provided for measuring a duration of the expulsion of the expelled polymer through the measuring nozzle, wherein a control module is provided for actuating the blocking module and the pressure generator, with which the blocking module can be moved to opening or closing position at predetermined times, with which the flow of the expelled polymer to the measurement volume can be controlled and the polymer can be used for flushing or measurement purposes, and wherein the measuring nozzle lies in a region of the measuring volume opposite the pressure, characterized in that an evaluation module is provided for calculating the viscosity based on the duration values obtained, wherein the calculated viscosity is proportional to the duration values, and a discharge channel is connected to the measurement volume for flushing used polymer, and an orifice of a line of an extraction module and an orifice of the discharge channel are located at opposite end regions of the measurement volume.

10. The measuring device according to claim 9, characterized in that the pressure generator comprises a piston that can be moved back and forth in the measurement volume.

11. The measuring device according to claim 9, characterized in that the orifice of the discharge channel is located in an upper end region of the measurement volume.

12. The measuring device according to claim 9, characterized in that the orifice of the line and the measuring nozzle are located in a lower end region of the measurement volume.

13. The measuring device according to claim 10, characterized in that the orifice of the discharge channel can be closed by the piston of the pressure generator at a beginning of movement of the piston into the measurement volume.

14. The measuring device according to claim 9, characterized in that the measurement nozzle and the orifice of the discharge channel are arranged in end regions of the measurement volume opposite one another in a vertical direction.

15. The measuring device according to claim 9, with a connected melting module for the polymer comprising an extruder.

16. The measuring device according to claim 15, characterized in that therefrom further comprising a granulate separator or a melt valve downstream the melting module, wherein the polymer for which the viscosity has been measured can be received by the granulate separator or melt valve.

* * * * *